United States Patent [19]
O'Meara

[11] Patent Number: 5,491,580
[45] Date of Patent: Feb. 13, 1996

[54] HIGH POWER MULTILAYER STACK QUARTER WAVE PLATE

[75] Inventor: Thomas R. O'Meara, Malibu, Calif.

[73] Assignee: The United States of America as represented by the Secretary of the Air Force, Washington, D.C.

[21] Appl. No.: 993,766

[22] Filed: Dec. 17, 1992

[51] Int. Cl.$^6$ .............................. G02B 5/30; G02B 5/28; G02B 7/195; G02F 1/03
[52] U.S. Cl. .................. 359/247; 359/249; 359/487; 359/578; 359/584
[58] Field of Search .............................. 359/71, 247, 260, 359/487, 494, 495, 578, 583, 584, 249

[56] References Cited

U.S. PATENT DOCUMENTS

| | | | |
|---|---|---|---|
| 2,403,731 | 7/1946 | MacNeille | 359/583 |
| 3,753,608 | 8/1973 | Bernal . | |
| 3,851,973 | 12/1974 | Macck | 356/106 LR |
| 4,084,883 | 4/1978 | Eastman et al. | 359/584 |
| 4,127,322 | 11/1978 | Jacobson et al. | 353/31 |
| 4,141,651 | 2/1979 | Smith et al. | 356/350 |
| 4,222,668 | 9/1980 | Henry | 356/350 |
| 4,449,824 | 5/1984 | Matthews | 356/350 |
| 4,595,261 | 6/1986 | Baasch et al. | 359/583 |
| 5,225,930 | 7/1993 | Land et al. | 359/578 |

FOREIGN PATENT DOCUMENTS

| | | | |
|---|---|---|---|
| 935663 | 2/1950 | Germany | 359/487 |
| 2-264904 | 10/1990 | Japan | 359/487 |

*Primary Examiner*—Martin Lerner
*Attorney, Agent, or Firm*—Robert L. Nathans; Donald J. Singer

[57] ABSTRACT

A multilayer stack of alternating low index and high index of refraction low loss dielectric mirror layers are formed on top of a metallic mirror surface, the thicknesses of the mirror layers being chosen to satisfy the Bragg condition at a selected incident angle of polarized light. The dielectric layer adjacent the metallic reflective mirror substrate can have a thickness which produces circularly polarized light exiting the apparatus. An electro-optical layer of EO material can be substituted for the dielectric layer adjacent the metallic mirror and a controlled elliptically polarized output can be produced by altering the electric field applied across the EO layer. This device can be used as a very high power high speed EO modulator.

5 Claims, 1 Drawing Sheet

HIGH POWER MULTILAYER STACK QUARTER WAVE PLATE

BACKGROUND OF THE INVENTION

The present invention relates to the field of optical phase retarders and electro-optic modulators.

Conventional quarter-wave plates employ birefringent material, generally crystalline, which is of limited availability and size or cross sectional area. Further, since these conventional devices work in an optical transmission mode, there is no simple means of exacting heat from the area heated by even a moderate power laser beam. Thus the birefringent medium is subject to thermally induced aberrations and, at sufficiently high powers, to optical damage.

SUMMARY OF PREFERRED EMBODIMENTS OF THE INVENTION

In contrast, the present invention employs thin sheets of amorphous dielectric materials which are available in very large areas of 50 square cm. or more. Further, since the present device is reflective, it can be formed on a metal mirror which can be forced air or liquid cooled if desired. Such a cooling is particularly effective since the thin sheet dielectric layers present a high thermal conductivity path to the metal mirror. Thus this device, working in conjunction with high power polarizers, permits one to construct high-power, path switching devices for laser radars or laser amplifiers, and high power modulators for communication systems, for example.

A multilayer stack of alternating low index and high index of refraction low loss dielectric mirror layers are formed on top of a metallic mirror surface, the thicknesses of the mirror layers being chosen to satisfy the Bragg condition at a selected incident angle of polarized light. The dielectric layer adjacent the metallic reflective mirror substrate can have a thickness which produces circularly polarized light exiting the apparatus. An electro-optical layer of EO material can be substituted for the dielectric layer adjacent the metallic mirror and a controlled elliptically polarized output can be produced by altering the electric field applied across the EO layer. This device can be used as a very high power high speed EO modulator.

BRIEF DESCRIPTION OF THE DRAWINGS

Other objects, features and advantages of the present invention will become apparent upon study of the following description taken in conjunction with the drawings in which.

DETAILED DESCRIPTION

Figure 1:
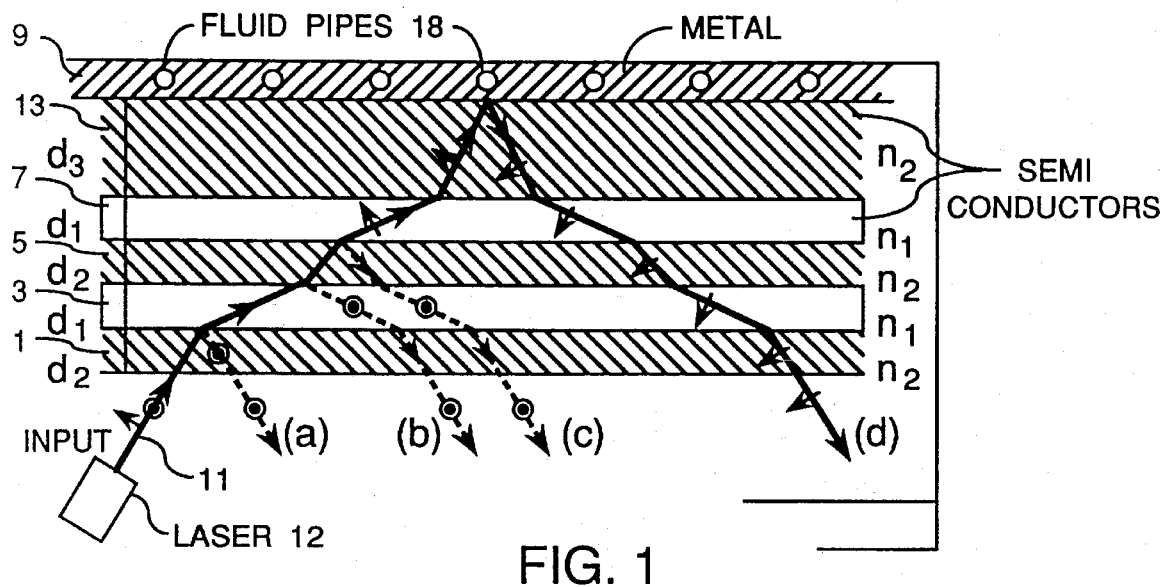
FIG. 1 illustrates a quarter wave plate embodying the invention.

The present invention employs a multilayer stack of low loss dielectric mirrors of alternating layers 3 and 7 of low index of refraction (n1) material and layers 1 and 5 of high index of refraction (n2) material on a metallic mirror substrate 9, as illustrated in FIG. 1. The incident input radiation 11 emerging from light beam source 12, impinges on layer 1 at such an angle that Brewster's angle is achieved at the interface between the low and high index materials. Thus, that polarization component which lies in the plane of incidence as designated by solid lines is completely transmitted at each layer interface as shown, while any orthogonal polarized component designate by dotted lines, is partially reflected at each layer interface as shown. The "in plane" component is reflected at the underlying metal mirror 9 or by a coating deposited on it, and is again transmitted without reflection through each dielectric interface on the way out.

The perpendicular component experiences a differing reflective path. Each successive interface reflection a,b,c,d, at each dielectric interface, reflects a portion of this polarization field. In order to enhance this reflection, the layer thicknesses d1 and d2 are chosen to satisfy the Bragg condition, giving a quarter wave projected optical path difference at the internal propagation angle. This is analogous to a conventional quarter-wave, multilayer reflecting coating except that the present system is tuned for off axis operation, and produces constructive interference of the multiple reflections from successive layers, at the selected internal angle.

The present invention operates with an input light beam 11 which is a linearly polarized plane wave, with the polarization at 45 degrees to the incidence plane. This field may be decomposed into two equal (copbased) polarization components which, as described above, enter the system and are reflected from it. Both polarization components experience nearly unity reflections via the mechanisms described above, and ideally exit the device as equal intensity polarizations with a 90 degree phase difference between them. This phase difference is controlled by the thickness of the last layer 13 before the metallic mirror, since this layer is passed by the inplane polarization and effectively not passed by the orthogonal polarization.

Figure 2:
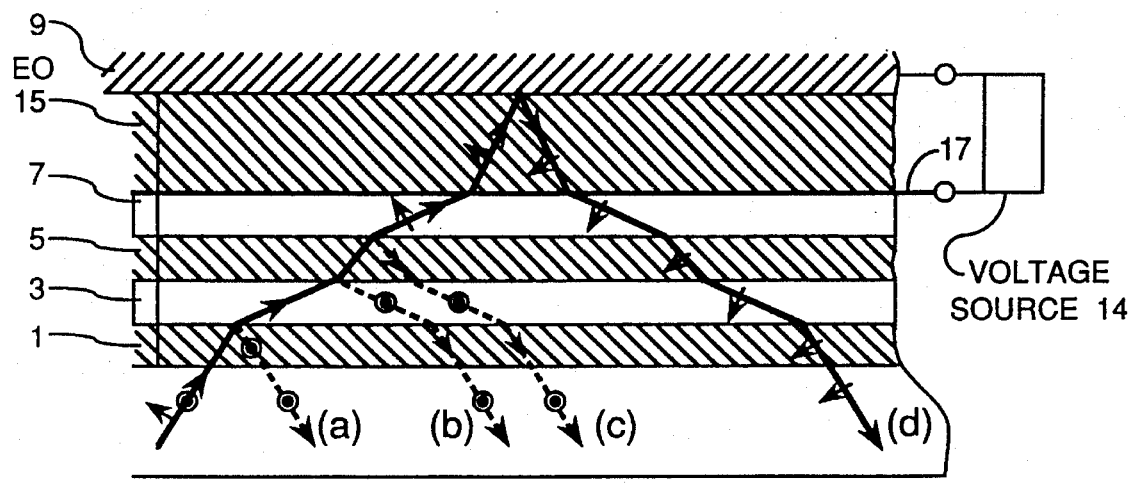
FIG. 2 illustrates an electro-optic phase modulator embodying the invention.

Since this device operates in the reflective mode, rather than the transmissive mode, fluid cooling conduits 18 may be employed to directly cool the metallic mirror of both FIGS. 1 and 2 to produce the advantages stated above.

Although the major utility for the applications described below call for a quarter-wave plate, other wave plates can be formed by changing the thickness of the last layer 13, giving in general an elliptically polarized output.

A variant of the present invention employs an embedded electrooptic (EO) material to electronically control the ellipticity of the output polarization state. For this purpose one substitutes the EO material at 15, shown in FIG. 2, for the dielectric layer 13 of FIG. 1, adjacent the mirror and embeds a thin film transparent electrode 17 such as indium tin oxide on the side of the EO layer 15 opposite the metallic support mirror. Such a device permits one to realize a variety of very high power, high-speed EO modulators.

As one example, a switching system or pulse modulator may be realized when operating in conjunction with a high power polarization selector. In general two voltages, V1 and V2, are applied across the buried EO layer 13 by voltage source 14, with a voltage V1 applied thereto producing a phase shift (in the EO layer path) of an even multiple of Pi (yielding a full-wave plate) while V2 will produce an odd multiple (yielding a half-wave plate). This produces either an output polarization state replicating the input (with V1) or perpendicular to it (with V2), which is either passed by the aforesaid polarization selector or not (or switched between the two outputs). With careful control of the buried layer, V1 may be zero. Because of the double pass of light through the EO layer, the EO material may be half the thickness of a conventional EO modulator.

Similarly, amplitude and phase modulators can be generated which are entirely analogous to conventional EO transmissive modulators. For example, a time varying V2 will polarization modulate the output of the electronic waveplate, which can serve as the output beam for a high-power polarization modulation communications system. If this output power is diffracted from the grating polarizer, either output beam is amplitude modulated and can service an AM communications system. Since the higher power modulators may require dimensions which are 30 cm or more in area, with large electrode capacitance values, high speed modulators may be better constructed as traveling wave modulators in which a short pulse element of the modulation sequence electrical signal propagates down the electrode structure as a terminated transmission line.

Since variations on the above described devices will be readily apparent to the workers in the art, the scope of the invention is to be limited only by the terms of the following claims and art recognized equivalents thereof.

I claim:

1. Multilayer stack phase retardation plate apparatus comprising:
   (a) a multilayer stack of low index of refraction and high index or refraction low loss dielectric mirror layers formed upon a reflective mirror substrate, the thicknesses of said mirror layers being chosen to satisfy the Bragg condition, producing constructive interference of multiple reflections from successive layers at a selected incident angle of light directed at said multilayered stack such that the Brewster angle is achieved at interfaces between the low and high index dielectric mirror layers; and
   (b) further including means for fluid cooling the reflective mirror substrate, enabling said apparatus to receive and retransmit high power light beams.

2. The apparatus of claim 1 whereby the dielectric layer adjacent the reflective mirror substrate has a thickness which produces a ninety degree phase retardation of light passing therethrough which can produce circularly polarized light exiting said retardation plate apparatus.

3. The apparatus of claim 1 including means for directing polarized light at said multilayered stack having a linearly polarized plane wave, with the polarization thereof at forty five degrees with respect to the incident plane.

4. Multilayer stack phase retardation plate apparatus comprising:
   (a) a multilayer stack of low index of refraction and high index or refraction low loss dielectric mirror layers formed upon a substrate, the thicknesses of said mirror layers being chosen to satisfy the Bragg condition, producing constructive interference of multiple reflections from successive layers at a selected incident angle of light directed at said multilayered stack such that the Brewster angle is achieved at interfaces between the low and high index dielectric mirror layers;
   (b) and wherein a dielectric layer contacting the reflective metallic mirror substrate is composed of an electrooptic material having an index of refraction which can be varied by changing the strength of an electric field applied thereto; and
   (c) further including means for fluid cooling the reflective mirror substrate, enabling said apparatus to receive and retransmit high power light beams.

5. Apparatus of claim 4 including a voltage source for varying the strength of said electrical field, said voltage source being coupled to said electro-optic material via electrode means.

* * * * *